US012639648B2

(12) United States Patent
Yin et al.

(10) Patent No.: US 12,639,648 B2
(45) Date of Patent: May 26, 2026

(54) METHOD AND APPARATUS FOR BASELINE MONITORING AND ALARMING, COMPUTER DEVICE, AND STORAGE MEDIUM

(71) Applicant: Beijing Volcano Engine Technology Co., Ltd., Beijing (CN)

(72) Inventors: Zhensheng Yin, Beijing (CN); Xionghua Hu, Beijing (CN); Guitao Ding, Beijing (CN); Shanshan Wang, Beijing (CN); Huarui Zhang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/968,095

(22) Filed: Dec. 4, 2024

(65) Prior Publication Data

US 2025/0190906 A1     Jun. 12, 2025

(30) Foreign Application Priority Data

Dec. 11, 2023     (CN) .......................... 202311694694.9

(51) Int. Cl.
*G06Q 10/0631* (2023.01)
*G06F 11/32* (2006.01)

(52) U.S. Cl.
CPC ....... *G06Q 10/06315* (2013.01); *G06F 11/32* (2013.01); *G06F 11/327* (2013.01); *G06Q 10/06316* (2013.01)

(58) Field of Classification Search
CPC .......................... G06Q 10/06316–0633; G06Q 10/06315–0633; G06F 9/4837–5038; G06F 11/0757
See application file for complete search history.

(56) References Cited

U.S. PATENT DOCUMENTS 6,601,035 B1 *  7/2003  Panagos ............. G06Q 10/0633
                                                            705/7.22
8,005,705 B2 *  8/2011  Gura ................ G06Q 10/06316
                                                            705/7.26

(Continued)

FOREIGN PATENT DOCUMENTS

WO     WO-2022095848 A1 *  5/2022   .......... G06F 11/3017

OTHER PUBLICATIONS

Time Management in Workflow Systems Johann Eder, Euthimios Panagos, Heinz Pozewaunig, Michael Rabinovich (Year: 1999).*

(Continued)

*Primary Examiner* — April Y Blair
*Assistant Examiner* — Paul V Mills
(74) *Attorney, Agent, or Firm* — Alleman Hall LLP

(57) ABSTRACT

The present disclosure relates to a method and apparatus for baseline monitoring and alarming, a computer device, and a storage medium. The method includes: obtaining business operation-related data of all task instances on a target baseline; generating a baseline monitoring link graph according to the task instances and the corresponding business operation-related data; traversing the baseline monitoring link graph from a baseline margin water level, and determining a predicted completion time of a task instance according to a predicted start time of the task instance, an upstream dependency state of the task instance, and a historical running duration of the task instance in the baseline monitoring link graph; determining a margin value of the target baseline according to a commitment completion time and the predicted completion time set for the task instance; and determining whether to trigger alarm information for the target baseline.

18 Claims, 4 Drawing Sheets

(56)                    References Cited

U.S. PATENT DOCUMENTS

| 11,481,245 | B1 * | 10/2022 | Oliver | G06F 8/41 |
| 2009/0158287 | A1 * | 6/2009 | Cardelli | G06F 11/3414 |
| | | | | 718/102 |
| 2010/0251241 | A1 * | 9/2010 | Cardelli | G06F 9/5038 |
| | | | | 718/100 |
| 2013/0197958 | A1 * | 8/2013 | Kawecki | G06Q 10/0633 |
| | | | | 705/7.17 |
| 2013/0290064 | A1 * | 10/2013 | Altamirano | G06Q 30/06 |
| | | | | 705/7.26 |
| 2015/0033233 | A1 * | 1/2015 | Hosokawa | G06F 11/30 |
| | | | | 718/102 |
| 2017/0206477 | A1 * | 7/2017 | Almasan | G06Q 10/0633 |
| 2020/0125963 | A1 * | 4/2020 | von Trapp | G06Q 10/06313 |

OTHER PUBLICATIONS

Project Management Monitoring Based on Expected Duration Entropy Shiva Cohen Kashi, Shai Rozenes and Irad Ben-Gal (Year: 2020).*
Dynamic Checking and Solution to Temporal Violations in Concurrent Workflow Processes YanHua Du, PengCheng Xiong, YuShun Fan, and Xitong Li (Year: 2011).*
A probabilistic strategy for temporal constraint management in scientific workflow systems Xiao Liu, Zhiwei Ni, Jinjun Chen and Yun Yang (Year: 2011).*
Controllability of Time-Aware Processes at Run Time Andreas Lanz, Roberto Posenato, Carlo Combi, and Manfred Reichert (Year: 2013).*

* cited by examiner

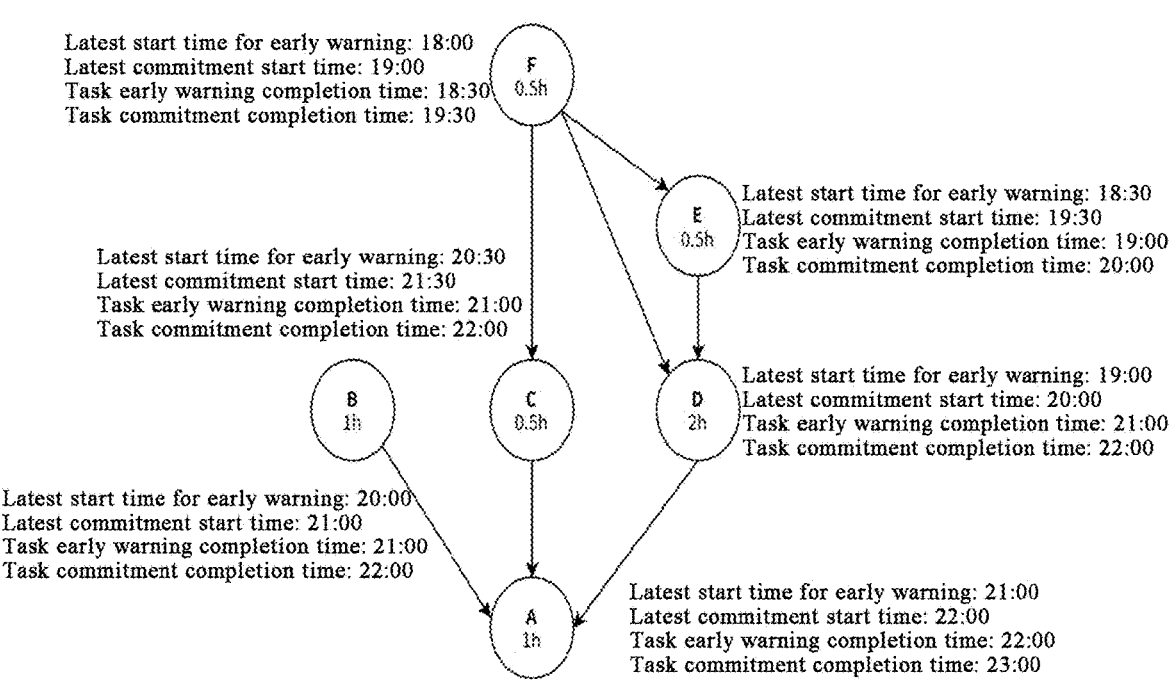

Latest start time for early warning: 18:00
Latest commitment start time: 19:00
Task early warning completion time: 18:30
Task commitment completion time: 19:30

Latest start time for early warning: 18:30
Latest commitment start time: 19:30
Task early warning completion time: 19:00
Task commitment completion time: 20:00

Latest start time for early warning: 20:30
Latest commitment start time: 21:30
Task early warning completion time: 21:00
Task commitment completion time: 22:00

Latest start time for early warning: 19:00
Latest commitment start time: 20:00
Task early warning completion time: 21:00
Task commitment completion time: 22:00

Latest start time for early warning: 20:00
Latest commitment start time: 21:00
Task early warning completion time: 21:00
Task commitment completion time: 22:00

Latest start time for early warning: 21:00
Latest commitment start time: 22:00
Task early warning completion time: 22:00
Task commitment completion time: 23:00

Commitment time: 23:00
Early warning margin: 1h
Early warning time: 22:00

FIG. 1

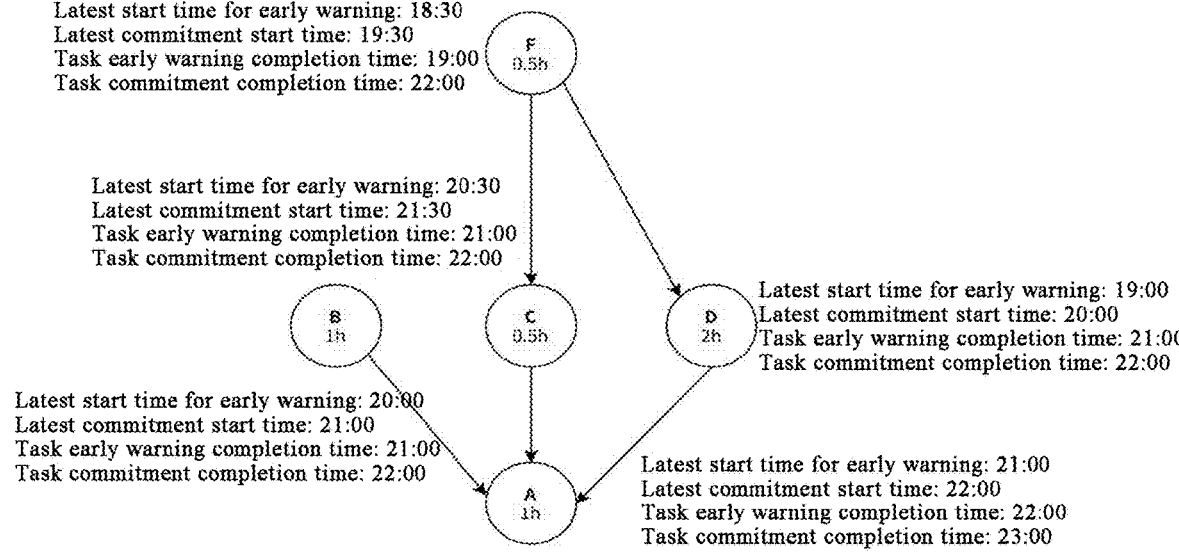

Latest start time for early warning: 18:30
Latest commitment start time: 19:30
Task early warning completion time: 19:00
Task commitment completion time: 22:00

Latest start time for early warning: 20:30
Latest commitment start time: 21:30
Task early warning completion time: 21:00
Task commitment completion time: 22:00

Latest start time for early warning: 19:00
Latest commitment start time: 20:00
Task early warning completion time: 21:00
Task commitment completion time: 22:00

Latest start time for early warning: 20:00
Latest commitment start time: 21:00
Task early warning completion time: 21:00
Task commitment completion time: 22:00

Latest start time for early warning: 21:00
Latest commitment start time: 22:00
Task early warning completion time: 22:00
Task commitment completion time: 23:00

Commitment time: 23:00
Early warning margin: 1h
Early warning time: 22:00

FIG. 2

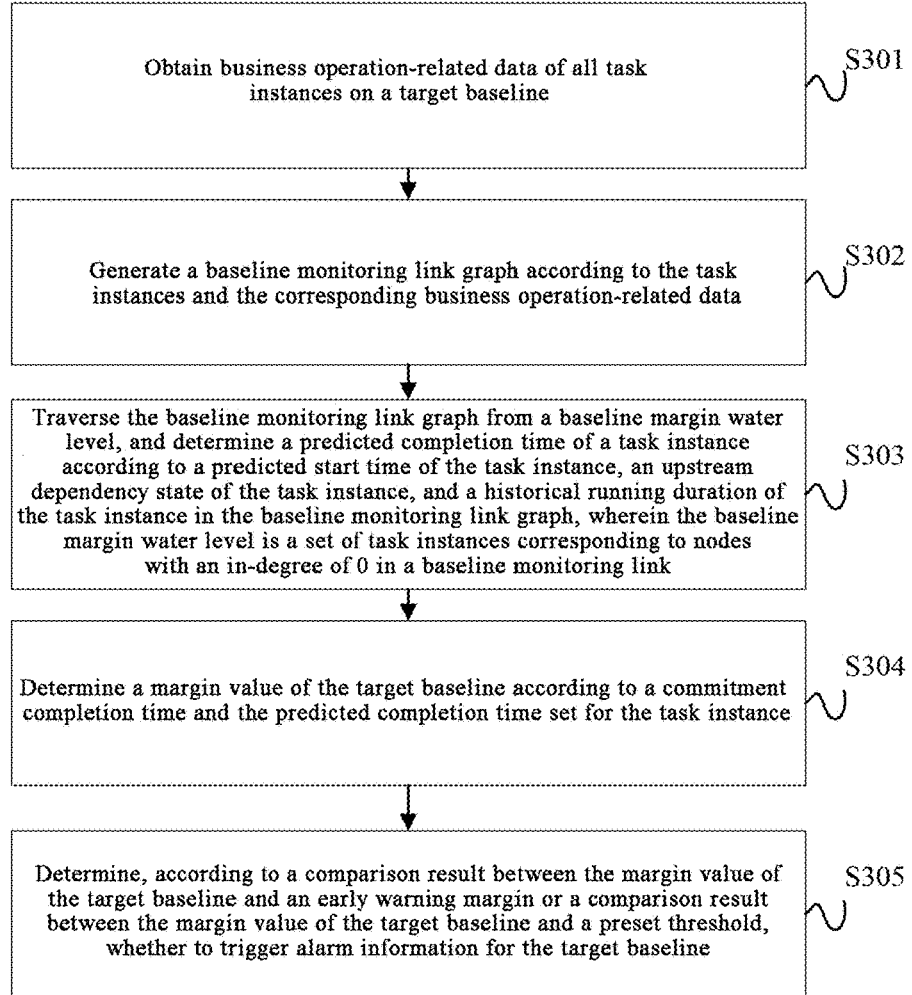

Obtain business operation-related data of all task instances on a target baseline ∿ S301

Generate a baseline monitoring link graph according to the task instances and the corresponding business operation-related data ∿ S302

Traverse the baseline monitoring link graph from a baseline margin water level, and determine a predicted completion time of a task instance according to a predicted start time of the task instance, an upstream dependency state of the task instance, and a historical running duration of the task instance in the baseline monitoring link graph, wherein the baseline margin water level is a set of task instances corresponding to nodes with an in-degree of 0 in a baseline monitoring link ∿ S303

Determine a margin value of the target baseline according to a commitment completion time and the predicted completion time set for the task instance ∿ S304

Determine, according to a comparison result between the margin value of the target baseline and an early warning margin or a comparison result between the margin value of the target baseline and a preset threshold, whether to trigger alarm information for the target baseline ∿ S305

FIG. 3

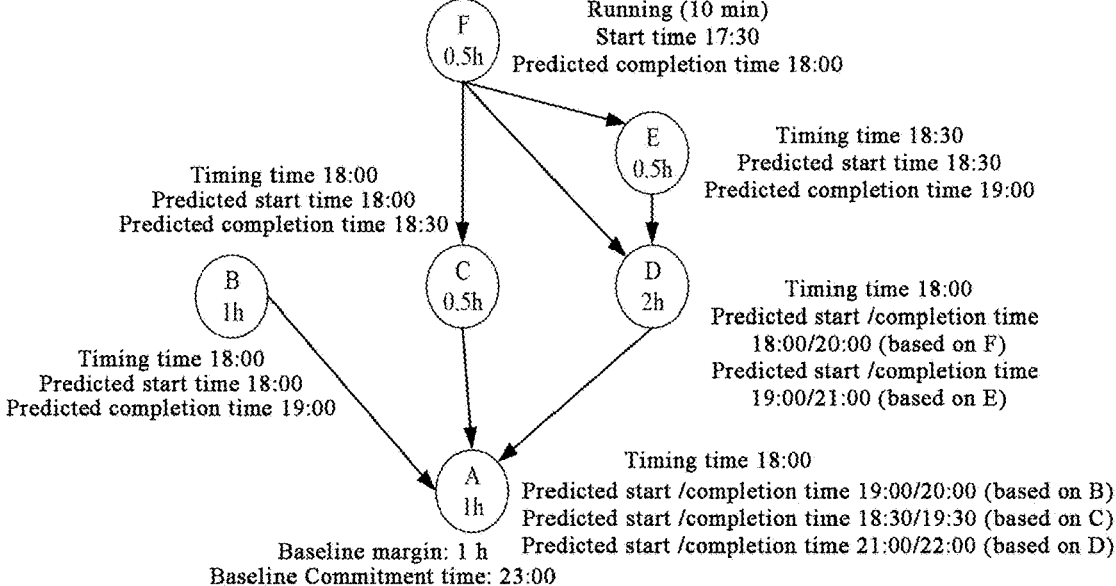

Running (10 min)
Start time 17:30
Predicted completion time 18:00

Timing time 18:30
Predicted start time 18:30
Predicted completion time 19:00

Timing time 18:00
Predicted start time 18:00
Predicted completion time 18:30

Timing time 18:00
Predicted start /completion time
18:00/20:00 (based on F)
Predicted start /completion time
19:00/21:00 (based on E)

Timing time 18:00
Predicted start time 18:00
Predicted completion time 19:00

Timing time 18:00
Predicted start /completion time 19:00/20:00 (based on B)
Predicted start /completion time 18:30/19:30 (based on C)
Predicted start /completion time 21:00/22:00 (based on D)

Baseline margin: 1 h
Baseline Commitment time: 23:00

FIG. 4

METHOD AND APPARATUS FOR BASELINE MONITORING AND ALARMING, COMPUTER DEVICE, AND STORAGE MEDIUM

CROSS-REFERENCE TO RELATED APPLICATION(S)

This application claims priority to Chinese Application No. 202311694694.9 filed Dec. 11, 2023, the disclosure of which is incorporated herein by reference in its entity.

FIELD

The present disclosure relates to the field of operation and maintenance management technologies, and in particular, to a method and apparatus for baseline monitoring and alarming, a computer device, and a storage medium.

BACKGROUND

In a big data computing scenario, there are a large number of tasks that need operation and maintenance management, and the dependency relationships between the tasks are complex, such as circular dependency between tasks, self-dependency, and cross-cycle dependency. In addition, the dependency relationships between the tasks may change dynamically with business changes. Timely data production is crucial for a business, and configuring monitoring and alarming is an effective method to ensure timely production of tasks. However, ordinary monitoring and alarming cannot meet actual production requirements.

SUMMARY

In view of this, the present disclosure provides a method and apparatus for baseline monitoring and alarming, a computer device, and a storage medium.

According to a first aspect, the present disclosure provides a method for baseline monitoring and alarming. The method includes:

obtaining business operation-related data of all task instances on a target baseline;

generating a baseline monitoring link graph according to the task instances and the corresponding business operation-related data;

traversing the baseline monitoring link graph from a baseline margin (balance) water level, and determining a predicted completion time of a task instance according to a predicted start time of the task instance, an upstream dependency state of the task instance, and a historical running duration of the task instance in the baseline monitoring link graph, wherein the baseline margin water level is a set of task instances corresponding to nodes with an in-degree of 0 in a baseline monitoring link;

determining a margin value of the target baseline according to a commitment completion time and the predicted completion time set for the task instance; and determining, according to a comparison result between the margin value of the target baseline and an early warning margin or a comparison result between the margin value of the target baseline and a preset threshold, whether to trigger alarm information for the target baseline.

In this embodiment of the present disclosure, a baseline monitoring link graph is generated according to all task instances on a target baseline and business operation-related data corresponding to the task instances, and then the baseline monitoring link graph is traversed, and the predicted completion time of the task instance is determined according to the predicted start time of the task instance, the upstream dependency state of the task instance, and the historical running duration of the task instance in the baseline monitoring link graph. Then, a margin value of the target baseline is determined based on the commitment completion time and the predicted completion time of the task instance, and a final alarm situation is determined according to a comparison result between the margin value of the target baseline and the early warning margin or a comparison result between the margin value of the target baseline and the preset threshold.

In an optional implementation, the generating a baseline monitoring link graph according to the task instances and the corresponding business operation-related data comprises:

obtaining an upstream task instance on which the task instance depends;

obtaining other downstream task instances, other than the task instance, associated with the upstream task instance;

determining, according to a business time corresponding to the execution of a same task by the other downstream task instances, whether to add the upstream task instance to the baseline monitoring link graph; and in response to the upstream task instance needing to be added to the baseline monitoring link graph, adding the upstream task instance to the baseline monitoring link graph, and recording a dependency relationship between the upstream task instance and the task instance.

In an optional implementation, after the generating a baseline monitoring link graph according to the task instances and the corresponding business operation-related data, the method further comprises:

in a case that a dependency relationship between the task instances contained in the baseline monitoring link graph changes, determining a newly added upstream dependent task instance corresponding to a changed task instance, and adding the newly added upstream dependent task instance and an upstream dependent task instance of the newly added upstream dependent task instance to the baseline monitoring link graph together to obtain an updated baseline monitoring link graph; and/or in a case that a dependency relationship between the task instances contained in the baseline monitoring link graph changes, determining an upstream dependent task instance removed corresponding to a changed task instance, and removing the removed upstream dependent task instance and an upstream dependent task instance of the removed upstream dependent task instance from the baseline monitoring link graph together to obtain an updated baseline monitoring link graph.

In an optional implementation, before the traversing the baseline monitoring link graph from a baseline margin water level, the method further comprises:

obtaining a running change state of the task instance contained in the baseline monitoring link graph; and in a case that a reference task instance is run and completed, removing the reference task instance from the baseline monitoring link graph, and updating the baseline margin water level according to the baseline monitoring link graph from which the reference task instance is removed.

In an optional implementation, the traversing the baseline monitoring link graph from a baseline margin water level, and determining a predicted completion time of a task instance according to a predicted start time of the task instance, an upstream dependency state of the task instance, and a historical running duration of the task instance in the baseline monitoring link graph further comprises:

in a case that the task instance is traversed for a plurality of times, determining a plurality of initial predicted completion times of the task instance according to the predicted start time of the task instance, the upstream dependency state of the task instance, and the historical running duration of the task instance in the baseline monitoring link graph; and comparing time magnitudes of the individual initial predicted completion times, and using the initial predicted completion time with the largest time as the predicted completion time of the task instance.

In an optional implementation, before the traversing the baseline monitoring link graph from a baseline margin water level, the method further comprises:

obtaining a polling time for traversing the baseline monitoring link graph; and in response to a current moment reaches the polling time and the current moment being less than a baseline margin safety time threshold, no longer traversing the baseline monitoring link graph, wherein the baseline margin safety time threshold is a minimum value of safety running time thresholds of all the task instances on the target baseline, and the safety running time threshold of the task instance is a minimum value of predicted start times of all downstream task instances of the task instance.

In an optional implementation, after the determining a predicted completion time of a task instance, the method further comprises:

in response to the predicted completion time being less than a baseline margin safety time threshold, removing the task instance from the baseline monitoring link graph, and no longer traversing the task instance, wherein the baseline margin safety time threshold is a minimum value of safety running time thresholds of all the task instances on the target baseline, and the safety running time threshold of the task instance is a minimum value of predicted start times of all downstream task instances of the task instance.

In an optional implementation, the determining, according to a comparison result between the margin value of the target baseline and an early warning margin or a comparison result between the margin value of the target baseline and a preset threshold, whether to trigger alarm information for the target baseline comprises:

in a case that the margin value of the target baseline is less than the preset threshold, or the margin value of the target baseline is less than the early warning margin, triggering an alarm; and in a case that the margin value of the target baseline is greater than or equal to the preset threshold, or the margin value of the target baseline is greater than or equal to the early warning margin, not triggering an alarm.

According to a second aspect, the present disclosure provides an apparatus for baseline monitoring and alarming. The apparatus comprises:

a first obtaining module, configured to obtain business operation-related data of all task instances on a target baseline;

a generation module, configured to generate a baseline monitoring link graph according to the task instances and the corresponding business operation-related data;

a first determination module, configured to traverse the baseline monitoring link graph from a baseline margin water level, and determine a predicted completion time of a task instance according to a predicted start time of the task instance, an upstream dependency state of the task instance, and a historical running duration of the task instance in the baseline monitoring link graph, wherein the baseline margin water level is a set of task instances corresponding to nodes with an in-degree of 0 in a baseline monitoring link;

a second determination module, configured to determine a margin value of the target baseline according to a commitment completion time and the predicted completion time set for the task instance; and a third determination module, configured to determine, according to a comparison result between the margin value of the target baseline and an early warning margin or a comparison result between the margin value of the target baseline and a preset threshold, whether to trigger alarm information for the target baseline.

According to a third aspect, the present disclosure provides a computer device. The computer device comprises a memory and a processor, the memory and the processor are communicatively connected to each other, the memory stores a computer instruction, and the processor executes the computer instruction to execute the method for baseline monitoring and alarming according to the first aspect or any one of the corresponding implementations of the first aspect.

According to a fourth aspect, the present disclosure provides a computer-readable storage medium having computer instructions stored thereon for causing a computer to execute the method for baseline monitoring and alarming according to the first aspect or any one of the corresponding implementations of the first aspect.

BRIEF DESCRIPTION OF THE DRAWINGS

In order to more clearly describe the specific embodiments of the present disclosure or the technical solutions in the prior art, the accompanying drawings for describing the specific embodiments or the prior art will be briefly described below. Obviously, the accompanying drawings in the following description show some embodiments of the present disclosure, and a person of ordinary skill in the art may still derive other drawings from these drawings without creative efforts.

FIG. 1 is a schematic diagram of a state of a task instance before a link changes in the related art;

FIG. 2 is a schematic diagram of a state of a task instance after a link changes in the related art;

FIG. 3 is a schematic flowchart of a method for baseline monitoring and alarming according to some embodiments of the present disclosure;

FIG. 4 is a schematic diagram of determining a margin value of a baseline based on a latest predicted completion time of a task instance according to some embodiments of the present disclosure;

DETAILED DESCRIPTION OF EMBODIMENTS

Figure 5:
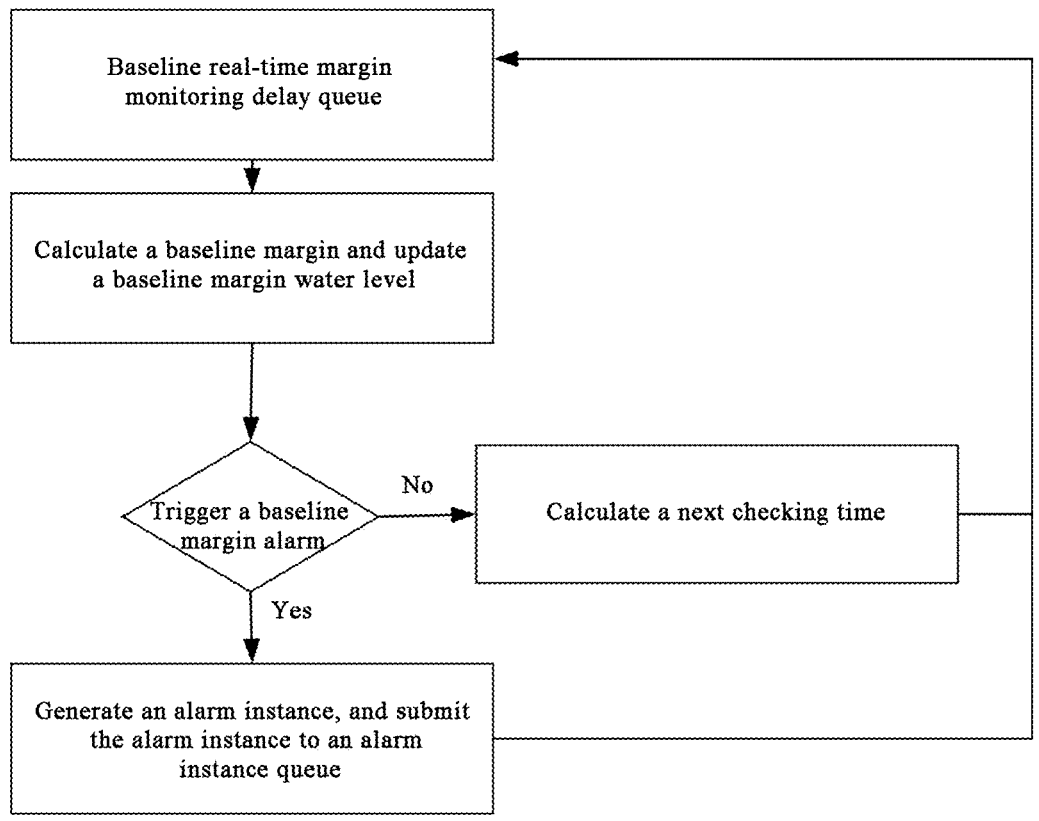
FIG. 5 is a schematic diagram of monitoring and alarming of a margin value of a baseline based on a delay queue according to some embodiments of the present disclosure.

To make the objectives, technical solutions, and advantages of the embodiments of the present disclosure clearer, the technical solutions in the embodiments of the present disclosure are described clearly and completely with reference to the accompanying drawings in the embodiments of the present disclosure. Obviously, the described embodiments are some but not all of the embodiments of the present disclosure. Based on the embodiments of the present disclosure, all other embodiments obtained by a person of ordinary skill in the art without creative efforts shall fall within the protection scope of the present disclosure.

For example, a current monitoring embedded point is bound to a task instance, a verification time corresponding to the task instance is obtained through calculation, and the state of the task instance is checked when the verification time is reached to determine a baseline state. This solution is prone to misjudgment of the baseline state, resulting in false alarms. For example, in FIG. 1, a latest start time for early warning of a task F node on a monitoring link G is 18:00. If A has not yet started to run at 18:00, a baseline early warning alarm is generated. However, if the link has changed before 18:00, as shown in FIG. 2, when D no longer depends on E, the latest start time for early warning of F becomes 18:30. In this case, even if F has not yet started to run at 18:00, a baseline early warning alarm should not be triggered. In a real big data scenario, link changes often occur. Therefore, a static monitoring strategy proposed in the current baseline monitoring solution is difficult to meet real baseline monitoring and alarming requirements.

In a big data computing scenario, timely data production is crucial for a business, and configuring monitoring and alarming is an effective method to ensure timely production of tasks. In a related technical solution, a guarantee task, a baseline commitment time, an early warning margin, and a dependency relationship between a plurality of tasks to be monitored set by a user are usually used to determine a task instance and verification time information corresponding to each task to be monitored, where the verification time information includes information such as a latest start time for early warning, a latest start time for commitment, a task early warning completion time, and a task commitment completion time. A baseline state is determined according to a state of a corresponding task instance when a verification time node is reached:

(1) If the task instance has started to run before the latest start time for early warning, and runs successfully before the task early warning completion time, it is determined that the baseline state is a safe state;

(2) If the task instance has not yet started to run at the latest start time for early warning, or the task instance has not yet run successfully at the task early warning completion time, it is determined that the baseline state is an early warning state; and (3) If the task instance has not yet started to run at the latest start time for commitment, or the task instance has not yet run successfully at the task commitment completion time, it is determined that the baseline state is a broken state.

However, in a real big data scenario, link changes often occur. Since the baseline monitoring solution involved in the related art usually belongs to a static monitoring strategy, the baseline margin monitoring strategy cannot be flexibly changed according to real baseline alarming requirements. To solve the above problems, according to an embodiment of the present disclosure, an embodiment of a method for baseline monitoring and alarming is provided. It should be noted that the steps shown in the flowchart of the accompanying drawings may be executed in a computer system such as a set of computer-executable instructions, and although a logical order is shown in the flowcharts, in some cases, the steps shown or described may be executed in an order different from that herein.

In this embodiment, a method for baseline monitoring and alarming is provided. FIG. 3 is a flowchart of the method for baseline monitoring and alarming according to an embodiment of the present disclosure. As shown in FIG. 3, the method may be applied to a server side, and the method flow includes the following steps.

Step S301: Obtain business operation-related data of all task instances on a target baseline.

Optionally, in this embodiment of the present disclosure, business operation-related data of all task instances on a target baseline is obtained from a baseline guarantee task instance (a task set with a requirement on a completion time of a service level agreement (SLA) for a user, which is recorded as C), where the business operation-related data includes business time, a running state, a predicted start time, a predicted end time (that is, a predicted completion time), and a predicted running duration of each task instance.

It should be explained that the business time of the task instance: that is, the actual execution time of the task instance. The predicted running duration of the task instance: that is, a running duration of a current task execution predicted based on a historical execution situation of the task, which is recorded as PTC. The predicted start time of the task instance: a time predicted to start the task instance based on an execution time of the task, an upstream dependent task, and the like, which is recorded as PST. The predicted completion time of the task instance: the predicted start time of the task instance plus the predicted running duration of the task instance, that is, the predicted completion time of the task instance, which is recorded as PFT. The predicted start time, the predicted end time, and the predicted running duration of the task instance satisfy the following relationship: PFT=PST+PTC. The running state of the task instance: that is, a state such as running end and running success.

Step S302: Generate a baseline monitoring link graph according to the task instances and the corresponding business operation-related data.

Optionally, each task instance and the business operation-related data corresponding to each task instance are added to a buffer queue. Then, task instances in the buffer queue are traversed until the queue is empty. Through the algorithm, a baseline monitoring link graph BG can be obtained.

The baseline monitoring link graph: a minimum directed acyclic graph (DAG) set of task instances that can monitor a delay risk of a baseline guarantee task, that is, a baseline monitoring link is a subgraph of the DAG of the task instances, which is recorded as BG.

Step S303: Traverse the baseline monitoring link graph from a baseline margin water level, and determine a predicted completion time of a task instance according to a predicted start time of the task instance, an upstream dependency state of the task instance, and a historical running duration of the task instance in the baseline monitoring link graph, wherein the baseline margin water level is a set of task instances corresponding to nodes with an in-degree of 0 in a baseline monitoring link.

Optionally, the predicted completion time of all the task instances in the baseline monitoring link BG can be calculated from the baseline margin water level, and is obtained through hierarchical traversal from top to bottom. The baseline margin water level is a set of task instances corresponding to nodes with an in-degree of 0 in the baseline monitoring link BG, that is, a set of root nodes of the BG, which is recorded as BWM.

Specifically, a given baseline monitoring link BG is traversed, a timing time (that is, the predicted start time) and an upstream dependency configured for a task and the historical running duration of the task instance are determined (wherein the historical running duration of the task to be monitored may be considered as the average running duration of the task, that is, determined according to historical running durations other than a maximum duration and a minimum duration in a plurality of historical running durations of the task to be monitored), and the predicted completion time of the task instance is obtained through the following calculation strategy:

1. When the task instance still fails after the maximum number of retries is reached, $PFT=t+\alpha*PTC$, where t is a failure moment, and $\alpha$ is a retry failure delay factor. The value is a configurable system value that represents the severity that the task instance still fails after the maximum number of retries is reached. A preferred value is 1 to 3. The PTC is determined according to the historical running duration of the task instance.

2. When the task instance fails but the maximum number of retries is not reached, $PFT=t+PTC$.

3. When the task instance is in a state of waiting for an upstream dependency to be completed, PFT=max{the timing time of the current task instant, the latest predicted completion time of the upstream task instant}

4. When the task instance is in a state that the upstream is ready but waits for submission, PFT=max{the timing time of the current task instant, the current time}+PTC 5. When the task instance is in a running state, PFT=the real start time of the current task instant+PTC.

6. When the task instance is in a running success state, PFT=the time when the task instance actually runs successfully Step S304: Determine a margin value of the target baseline according to a commitment completion time and the predicted completion time set for the task instance.

Optionally, the margin value of the baseline: a margin between a predicted completion time of all the baseline guarantee tasks and a baseline commitment time set by a user. A margin value calculation model of the baseline is defined as follows:

$$BB = \min\{CT - PFT_c\}, c \in C,$$

where: $PFT_c=\max\{PST_w+PTC_w+PTC_{w\to c}\}$, $w \in BWM$,

Therefore: $BB=\min\{CT-PST_w-PTC_w-PTC_{w\to c}\}$, $c \in C$, $w \in BWM$, where CT is the baseline commitment time set by the user, $PST_w$ is a predicted start time of a baseline water level task instance w, $PTC_w$ is a predicted running duration of the baseline water level task instance w, and $PTC_{w\to c}$ is an overall predicted running duration from the baseline margin water level instance w to the guarantee task c.

The baseline commitment time: a latest acceptable completion time that can be set by the user for all the baseline guarantee tasks. When the baseline guarantee tasks have not been all run and completed after the time node is exceeded, a baseline broken alarm needs to be triggered.

Therefore, after the predicted completion time of the task instance is determined, the commitment completion time set for the task instance minus the predicted completion time of the task instance=the margin value of the target baseline.

In addition, a running result of an upstream task instance (including success and failure) may also affect the predicted completion time of a downstream task instance, and further affect the accuracy of a subsequent margin value of the baseline. In this case, an update of the predicted start time of the downstream task instance is triggered according to the running result of the upstream task instance. For example, the upstream task instance runs successfully at 12:00, but the predicted start time of the downstream task instance is 12:05. In this case, the predicted start time of the downstream task instance is directly updated to 12:00. If the upstream task instance fails to run at 11:00, the predicted start time of the downstream task instance is updated to 11:30 by adding 30 minutes to the predicted start time of the downstream task instance according to the historical running duration of the upstream task instance, such as 30 minutes. In this way, the accuracy of the predicted start time of the downstream and the margin value of the baseline is ensured.

Step S305: Determine, according to a comparison result between the margin value of the target baseline and an early warning margin or a comparison result between the margin value of the target baseline and a preset threshold, whether to trigger alarm information for the target baseline.

Optionally, in this embodiment of the present disclosure, the early warning margin (that is, a buffer duration of the baseline that can be set by the user) and the preset threshold (for example, the value 0) are preset, and then whether the alarm information for the target baseline is triggered is obtained through the comparison result between the margin value of the target baseline and the early warning margin or the comparison result between the margin value of the target baseline and the preset threshold.

In this embodiment of the present disclosure, a baseline monitoring link graph is generated according to all task instances on a target baseline and business operation-related data corresponding to the task instances, and then the baseline monitoring link graph is traversed, and the predicted completion time of the task instance is determined according to the predicted start time of the task instance, the upstream dependency state of the task instance, and the historical running duration of the task instance in the baseline monitoring link graph. Then, a margin value of the target baseline is determined based on the commitment completion time and the predicted completion time of the task instance, and a final alarm situation is determined according to a comparison result between the margin value of the target baseline and the early warning margin or a comparison result between the margin value of the target baseline and the preset threshold. In this way, in this embodiment of the present disclosure, dynamic changes of the baseline link are considered, and an overall margin of the baseline is calculated in near real time, which can effectively reflect a real link situation, and can greatly improve the accuracy of baseline alarming, effectively ensuring the timely production of baseline guarantee tasks, and solving the problem in the related art that a baseline margin monitoring strategy cannot be flexibly changed according to real baseline alarming requirements.

In some optional implementations, the generating a baseline monitoring link graph according to the task instances and the corresponding business operation-related data comprises:

obtaining an upstream task instance on which the task instance depends;

obtaining another downstream task instance, other than the task instance, associated with the upstream task instance;

determining, according to a business time corresponding to the execution of a same task by the other downstream task instance, whether to add the upstream task instance to the baseline monitoring link graph; and if the upstream task instance needs to be added to the baseline monitoring link graph, adding the upstream task instance to the baseline monitoring link graph, and recording a dependency relationship between the upstream task instance and the task instance.

Optionally, in this embodiment of the present disclosure, after the task instance and the corresponding business operation-related data are added to the buffer queue, whether an upstream task instance that the task instance depends on needs to be included in the baseline monitoring link graph is determined according to a given pruning strategy.

Specifically, the upstream task instance on which each task instance depends is obtained, and another downstream task instance, other than the task instance, associated with the upstream task instance is obtained. If a current other downstream task instance has a longer business time when executing the same task, the upstream task instance is no longer added to the baseline monitoring link graph. That is, in a connected monitoring link, only a task instance with a longest business time needs to be concerned for the same task, and all instances do not need to be monitored. For example, for a task instance that is scheduled daily, the business time of the task instance includes two business times, November 1 and November 2. In this case, the task instance corresponding to November 1 is no longer added to the baseline monitoring link graph when a monitoring instance is selected. This is because the business running on November 2 depends on the successful running of the business on November 1. In this case, only the business state on November 2 needs to be checked, and the upstream task instance on November 1 does not need to be checked.

If the upstream task instance needs to be added to the baseline monitoring link graph, the upstream task instance is added to the baseline monitoring link graph, a parent-child dependency relationship between the upstream task instance and the task instance is recorded, and the buffer queue is continuously traversed. The above process is repeated until the buffer queue is empty. Through the algorithm, the baseline monitoring link graph BG can be obtained.

In some optional implementations, after the generating a baseline monitoring link graph according to the task instances and the corresponding business operation-related data, the method further comprises:

in a case that a dependency relationship between the task instances contained in the baseline monitoring link graph changes, determining a newly added upstream dependent task instance corresponding to a changed task instance, and adding the newly added upstream dependent task instance and an upstream dependent task instance of the newly added upstream dependent task instance to the baseline monitoring link graph together to obtain an updated baseline monitoring link graph; and/or in a case that a dependency relationship between the task instances contained in the baseline monitoring link graph changes, determining an upstream dependent task instance removed corresponding to a changed task instance, and removing the removed upstream dependent task instance and an upstream dependent task instance of the removed upstream dependent task instance from the baseline monitoring link graph together to obtain an updated baseline monitoring link graph.

Optionally, when the task dependency is updated, the baseline monitoring link graph BG is automatically updated through a baseline link updating algorithm. For example, when a dependency of a task instance A is modified, it may be determined first whether the task instance is in the baseline monitoring link graph BG. If the task instance is not in the baseline monitoring link graph BG, the modification may be ignored directly. If the task instance is in the baseline monitoring link graph BG, the upstream and downstream dependency relationships related to the task instance are updated. The specific situations are as follows:

When an upstream dependent task B of a task A is newly added, B and upstream task instances of B are all added to the BG to obtain an updated BG; and When an upstream dependent task B of a task A is removed, B and upstream task instances of B are all removed from the BG to obtain an updated BG.

In this embodiment of the present disclosure, dynamic updating of the baseline monitoring link graph when a task link changes is supported, which ensures that the baseline link is completely matched with an actual directed acyclic graph of the task instances, and can effectively solve problems such as inaccurate calculation of the margin value of the baseline and false alarm of the baseline caused by a change in task dependency.

In some optional implementations, before the traversing the baseline monitoring link graph from a baseline margin water level, the method further comprises:

obtaining a running change state of the task instance contained in the baseline monitoring link graph; and in a case that a reference task instance is run and completed, removing the reference task instance from the baseline monitoring link graph, and updating the baseline margin water level according to the baseline monitoring link graph from which the reference task instance is removed.

Optionally, the baseline margin water level changes continuously with a change of the state of the task instance. When the task instance runs successfully, the node needs to be removed from the BG. At this time, a new baseline monitoring link BG' is obtained. In this case, the new baseline margin water level is the task instance corresponding to the node with an in-degree of 0 in the graph BG'.

In this embodiment of the present disclosure, a message queue (such as a Rabbit Message Queue (RMQ) or Kafka (a distributed publish-subscribe messaging system)) is introduced. A task instance change event is sent when the state of the task instance is updated. A baseline margin water level dynamic updating module subscribes to the event, and triggers a change of the baseline margin water level based on the event.

In this embodiment of the present disclosure, a change of the baseline link is effectively perceived, and the baseline margin water level is updated in real time, so that the alarm is more accurate, and a false alarm is effectively reduced.

In some optional implementations, the traversing the baseline monitoring link graph from a baseline margin water level, and determining a predicted completion time of a task instance according to a predicted start time of the task instance, an upstream dependency state of the task instance, and a historical running duration of the task instance in the baseline monitoring link graph further comprises:

in a case that the task instance is traversed for a plurality of times, determining a plurality of initial predicted completion times of the task instance according to the predicted start time of the task instance, the upstream dependency state of the task instance, and the historical running duration of the task instance in the baseline monitoring link graph; and comparing time magnitudes of the initial predicted completion times, and using the initial predicted completion time with the largest time as the predicted completion time of the task instance.

Optionally, the baseline monitoring link graph is hierarchically traversed from the baseline margin water level from top to bottom. To calculate the predicted completion time of all the task instances in the entire baseline monitoring link graph, a queue is created to store the task instances to be monitored by the baseline, and then for each root node in the baseline monitoring link graph, the predicted completion time of each child node is calculated based on a calculation method of the predicted completion time of the root node, and the root node is added to the queue. Next, the algorithm enters a loop. As long as the queue is not empty, the loop body is continuously executed. For each child node, a calculation method of the predicted completion time of the child node is called by using the predicted completion time of the parent node as a parameter to calculate the predicted completion time. As shown in FIG. 4, if a certain task instance is traversed for a plurality of times, a plurality of initial predicted completion times are obtained. Then, an existing predicted completion time needs to be overwritten with a later initial predicted completion time. In this case, the baseline commitment time minus the latest predicted completion time in the guarantee task is the margin value of the target baseline.

In some optional implementations, before the traversing the baseline monitoring link graph from a baseline margin water level, the method further comprises:

obtaining a polling time for traversing the baseline monitoring link graph; and if a current moment reaches the polling time and the current moment is less than a baseline margin safety time threshold, no longer traversing the baseline monitoring link graph, wherein the baseline margin safety time threshold is a minimum value of safety running time thresholds of all the task instances on the target baseline, and the safety running time threshold of the task instance is a minimum value of predicted start times of all downstream task instances of the task instance.

Optionally, in some cases, the algorithm for calculating the predicted completion time of the task instance may not need to traverse the baseline monitoring link graph from the baseline margin water level to the baseline guarantee task. For example, in this embodiment of the present disclosure, the server may obtain a set polling time for each traversal of the baseline monitoring link graph, for example, traversing once every 5 minutes. At a current moment, for example, 11:55, 5 minutes have passed since the last traversal time 11:50, and the polling time is reached. If 11:55 is still less than the baseline margin safety time threshold (for example, 12:00), it indicates that the minimum value of the predicted start times of all the downstream task instances has not been reached. In this case, the baseline monitoring link graph may not need to be traversed.

In this embodiment of the present disclosure, a size relationship between the current moment and the baseline margin safety time threshold is compared to reduce a traversal frequency and save network resources.

In some optional implementations, after the determining a predicted completion time of a task instance, the method further comprises:

if the predicted completion time is less than a baseline margin safety time threshold, removing the task instance from the baseline monitoring link graph, and no longer traversing the task instance, wherein the baseline margin safety time threshold is a minimum value of safety running time thresholds of all the task instances on the target baseline, and the safety running time threshold of the task instance is a minimum value of predicted start times of all downstream task instances of the task instance.

Optionally, in this embodiment of the present disclosure, if the execution of obtaining the predicted completion time of the task instance has started, and the predicted completion time of a task instance is less than the baseline margin safety time threshold, the task instance is removed from the baseline monitoring link graph, and the task instance is no longer traversed. In this case, the predicted running duration of the task instance is the latest predicted completion time of the task instance in the baseline monitoring link graph minus the current time.

In this embodiment of the present disclosure, a size relationship between the predicted completion time of each task instance and the baseline margin safety time threshold is determined to reduce a traversal frequency and save network resources.

In some optional implementations, the determining, according to a comparison result between the margin value of the target baseline and an early warning margin or a comparison result between the margin value of the target baseline and a preset threshold, whether to trigger alarm information for the target baseline comprises:

in a case that the margin value of the target baseline is less than the preset threshold, or the margin value of the target baseline is less than the early warning margin, triggering an alarm; and in a case that the margin value of the target baseline is greater than or equal to the preset threshold, or the margin value of the target baseline is greater than or equal to the early warning margin, not triggering an alarm.

Optionally, in this embodiment of the present disclosure, a baseline real-time margin monitoring delay queue is set, as shown in FIG. 5. The server sets a thread to pull a detection instance, that is, a baseline monitoring link graph BG, from the baseline real-time margin monitoring delay queue at regular intervals (for example, 5 minutes). If the BG is not empty, the margin value of the baseline is calculated using the calculation method in the above embodiment. If a link in the baseline monitoring link graph reaches an end state, for example, all the guarantee tasks have been run and completed, the server directly exits. Otherwise, the real-time margin of the baseline is calculated to determine whether to alarm:

If the margin value of the target baseline is less than the preset threshold, or the margin value of the target baseline is less than the early warning margin, an alarm is triggered, an alarm instance is generated and submitted to an alarm instance processing queue, and a delay time is configured and the alarm instance is put back to the baseline real-time margin monitoring delay queue. If the margin value of the target baseline does not trigger an alarm (that is, the margin value of the target baseline is greater than or equal to the preset threshold, or the margin value of the target baseline is greater than or equal to the early warning margin), a next checking time (that is, a new baseline margin safety time threshold is obtained) needs to be calculated, and the corresponding set delay time is put back to the baseline real-time margin monitoring delay queue.

In this embodiment of the present disclosure, a change of a task link is automatically adapted and perceived, and a current alarm situation is obtained according to a margin value of the target baseline determined in real time, so that the accuracy of baseline alarming is greatly improved, and the timely production of baseline guarantee tasks is effectively ensured.

An apparatus for baseline monitoring and alarming is further provided in this embodiment. The apparatus is configured to implement the above embodiments and preferred implementations, and details of what have been described are not described again. As used hereinafter, the term "module" may be a combination of software and/or hardware that implements a predetermined function. Although the apparatus described in the following embodiments is preferably implemented by software, an implementation of hardware or a combination of software and hardware is also possible and contemplated.

Figure 6:
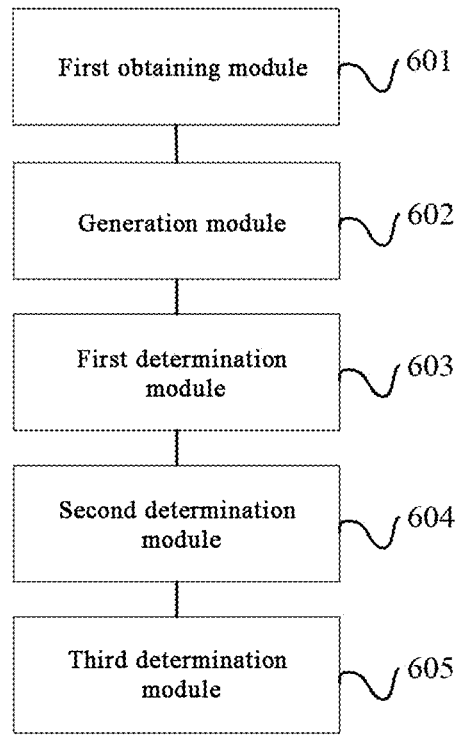
FIG. 6 is a block diagram of a structure of an apparatus for baseline monitoring and alarming according to some embodiments of the present disclosure.

This embodiment provides an apparatus for baseline monitoring and alarming. As shown in FIG. 6, the apparatus includes:

a first obtaining module 601, configured to obtain business operation-related data of all task instances on a target baseline;

a generation module 602, configured to generate a baseline monitoring link graph according to the task instances and the corresponding business operation-related data;

a first determination module 603, configured to traverse the baseline monitoring link graph from a baseline margin water level, and determine a predicted completion time of a task instance according to a predicted start time of the task instance, an upstream dependency state of the task instance, and a historical running duration of the task instance in the baseline monitoring link graph, wherein the baseline margin water level is a set of task instances corresponding to nodes with an in-degree of 0 in a baseline monitoring link;

a second determination module 604, configured to determine a margin value of the target baseline according to a commitment completion time and the predicted completion time set for the task instance; and a third determination module 605, configured to determine, according to a comparison result between the margin value of the target baseline and an early warning margin or a comparison result between the margin value of the target baseline and a preset threshold, whether to trigger alarm information for the target baseline.

In some optional implementations, the generation module 602 includes:

a first obtaining unit, configured to obtain an upstream task instance on which the task instance depends;

a second obtaining unit, configured to obtain other downstream task instances, other than the task instance, associated with the upstream task instance;

a first determination unit, configured to determine, according to a business time corresponding to the execution of a same task by the other downstream task instance, whether to add the upstream task instance to the baseline monitoring link graph; and an adding unit, configured to add the upstream task instance to the baseline monitoring link graph in response to the upstream task instance needing to be added to the baseline monitoring link graph, and record a dependency relationship between the upstream task instance and the task instance.

In some optional implementations, the apparatus further comprises:

a fourth determination module, configured to, after the generating a baseline monitoring link graph according to the task instances and the corresponding business operation-related data, in a case that a dependency relationship between the task instances contained in the baseline monitoring link graph changes, determine a newly added upstream dependent task instance corresponding to a changed task instance, and add the newly added upstream dependent task instance and an upstream dependent task instance of the newly added upstream dependent task instance to the baseline monitoring link graph together to obtain an updated baseline monitoring link graph; and/or a fifth determination module, configured to, in a case that a dependency relationship between the task instances contained in the baseline monitoring link graph changes, determine an upstream dependent task instance removed corresponding to a changed task instance, and remove the removed upstream dependent task instance and an upstream dependent task instance of the removed upstream dependent task instance from the baseline monitoring link graph together to obtain an updated baseline monitoring link graph.

In some optional implementations, the apparatus further comprises:

a second obtaining module, configured to obtain a running change state of the task instance contained in the baseline monitoring link graph before the traversing the baseline monitoring link graph from a baseline margin water level; and an updating module, configured to remove a reference task instance from the baseline monitoring link graph in a case that the reference task instance is run and completed, and update the baseline margin water level according to the baseline monitoring link graph from which the reference task instance is removed.

In some optional implementations, the first determination module 603 includes:

a second determination unit, configured to determine a plurality of initial predicted completion times of the task instance according to the predicted start time of the task instance, the upstream dependency state of the task instance, and the historical running duration of the task instance in the baseline monitoring link graph in a case that the task instance is traversed for a plurality of times; and a comparison unit, configured to compare time magnitudes of the individual initial predicted completion times, and use the initial predicted completion time with the largest time as the predicted completion time of the task instance.

In some optional implementations, the apparatus further comprises:

a third obtaining module, configured to obtain a polling time for traversing the baseline monitoring link graph before the traversing the baseline monitoring link graph from a baseline margin water level; and a first non-traversal module, configured to no longer traverse the baseline monitoring link graph in response to a current moment reaches the polling time and the current moment being less than a baseline margin safety time threshold, wherein the baseline margin safety time threshold is a minimum value of safety running time thresholds of all the task instances on the target baseline, and the safety running time threshold of the task instance is a minimum value of predicted start times of all downstream task instances of the task instance.

In some optional implementations, the apparatus further comprises:

a second non-traversal module, configured to remove the task instance from the baseline monitoring link graph and no longer traverse the task instance in response to the predicted completion time being less than a baseline margin safety time threshold after the determining a predicted completion time of a task instance, wherein the baseline margin safety time threshold is a minimum value of safety running time thresholds of all the task instances on the target baseline, and the safety running time threshold of the task instance is a minimum value of predicted start times of all downstream task instances of the task instance.

In some optional implementations, the third determination module 605 includes:

a first alarm unit, configured to trigger an alarm in a case that the margin value of the target baseline is less than the preset threshold, or the margin value of the target baseline is less than the early warning margin; and a second alarm unit, configured to not trigger an alarm in a case that the margin value of the target baseline is greater than or equal to the preset threshold, or the margin value of the target baseline is greater than or equal to the early warning margin.

The apparatus for baseline monitoring and alarming in this embodiment is presented in the form of functional units. The unit herein refers to an ASIC circuit, a processor and a memory that execute one or more software or firmware programs, and/or another device that can provide the above functions.

Further functional descriptions of the foregoing modules and units are the same as those of the corresponding embodiments, which are not described herein again.

An embodiment of the present disclosure further provides a computer device, which has the apparatus for baseline monitoring and alarming shown in FIG. 6.

Figure 7:
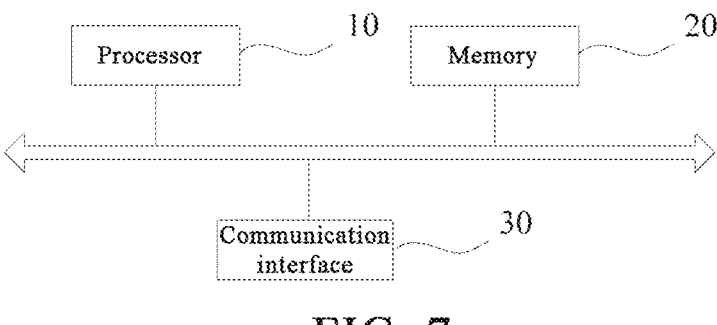
FIG. 7 is a schematic diagram of a hardware structure of a computer device according to an embodiment of the present disclosure.

Referring to FIG. 7, FIG. 7 is a schematic diagram of a structure of a computer device according to an optional embodiment of the present disclosure. As shown in FIG. 7, the computer device includes: one or more processors 10, a memory 20, and an interface for connecting the components, including a high-speed interface and a low-speed interface. The components communicate with each other through different buses and may be installed on a common mainboard or installed in another manner as required. The processor may process instructions executed in the computer device, including instructions stored in the memory or the memory and displayed on an external input/output apparatus (such as a display device coupled to the interface) to display graphical information of a graphical user interface (GUI). In some optional implementations, if required, a plurality of processors and/or a plurality of buses may be used together with a plurality of memories and a plurality of memories. Similarly, a plurality of computer devices may be connected, and each device provides some necessary operations (for example, as a server array, a group of blade servers, or a multi-processor system). FIG. 7 shows one processor 10 as an example.

The processor 10 may be a central processing unit, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable gate array, a general array logic, or any combination thereof.

The memory 20 stores instructions executable by at least one processor 10, so that the at least one processor 10 executes the method shown in the above embodiments.

The memory 20 may include a program storage area and a data storage area. The program storage area may store an operating system and an application program required for at least one function. The data storage area may store data created according to use of the computer device for presenting a landing page of a mini program. In addition, the memory 20 may include a high-speed random access memory, and may further include a non-transitory memory, for example, at least one magnetic disk storage device, a flash memory device, or another non-transitory solid-state storage device. In some optional implementations, the memory 20 may optionally include a memory remotely arranged relative to the processor 10, and the remote memory may be connected to the computer device through a network. Examples of the network include, but are not limited to, the Internet, an intranet, a local area network, a mobile communication network, and a combination thereof.

The memory 20 may include a volatile memory, for example, a random access memory. The memory may alternatively include a non-volatile memory, for example, a flash memory, a hard disk, or a solid-state drive. The memory 20 may further include a combination of the foregoing types of memories.

The computer device further includes a communication interface 30, configured to communicate between the computer device and another device or a communication network.

An embodiment of the present disclosure further provides a computer-readable storage medium. The method according to the embodiment of the present disclosure may be implemented in hardware, firmware, or may be implemented as computer code recorded in a storage medium or originally stored in a remote storage medium or a non-transitory machine-readable storage medium and to be stored in a local storage medium through a network, so that the method described herein may be stored on such software processing in a storage medium using a general-purpose computer, a dedicated processor, or programmable or dedicated hardware. The storage medium may be a magnetic disk, an optical disc, a read-only memory, a random access memory, a flash memory, a hard disk, a solid-state drive, or the like. Further, the storage medium may further include a combination of the foregoing types of memories. It may be understood that a computer, a processor, a microprocessor controller, or programmable hardware includes a storage component that may store or receive software or computer code, and when the software or computer code is accessed and executed by the computer, the processor, or the hardware, the method shown in the above embodiments is implemented.

Although the embodiments of the present disclosure are described with reference to the accompanying drawings, various modifications and variations can be made to the present disclosure by those skilled in the art without departing from the spirit and scope of the present disclosure, and such modifications and variations all fall within the scope defined by the appended claims.

We claim:

1. A method for baseline monitoring and alarming, the method comprising:

obtaining, by a server, business operation-related data of all task instances on a target baseline from a baseline guarantee task instance;

generating, by the server, a baseline monitoring link graph by adding the task instances and the corresponding business operation-related data to a buffer queue and traversing the buffer queue;

traversing, by the server, the baseline monitoring link graph from a baseline margin water level, wherein the baseline margin water level is a set of task instances corresponding to nodes with an in-degree of 0 in a baseline monitoring link, and determining, by the server, a predicted completion time of a task instance according to a predicted start time of the task instance, an upstream dependency state of the task instance, and a historical running duration of the task instance in the baseline monitoring link graph, comprising:

in a case that the task instance is traversed for a plurality of times, determining a plurality of initial predicted completion times of the task instance according to the predicted start time of the task instance, the upstream dependency state of the task instance, and the historical running duration of the task instance in the baseline monitoring link graph; and comparing time magnitudes of the individual initial predicted completion times, and using an initial predicted completion time with a largest time as the predicted completion time of the task instance;

determining, by the server, a margin value of the target baseline according to a commitment completion time and the predicted completion time set for the task instance; and determining, by the server and according to a comparison result between the margin value of the target baseline and an early warning margin or a comparison result between the margin value of the target baseline and a preset threshold, whether to trigger alarm information for the target baseline.

2. The method according to claim 1, wherein the generating, by the server, a baseline monitoring link graph by adding the task instances and the corresponding business operation-related data to a buffer queue and traversing the buffer queue comprises:

obtaining an upstream task instance on which the task instance depends;

obtaining other downstream task instances, other than the task instance, associated with the upstream task instance;

determining, according to a business time corresponding to an execution of a same task by the other downstream task instances, whether to add the upstream task instance to the baseline monitoring link graph; and in response to the upstream task instance needing to be added to the baseline monitoring link graph, adding the upstream task instance to the baseline monitoring link graph, and recording a dependency relationship between the upstream task instance and the task instance.

3. The method according to claim 1, wherein after the generating, by the server, a baseline monitoring link graph by adding the task instances and the corresponding business operation-related data to a buffer queue and traversing the buffer queue, the method further comprises:

in a case that a dependency relationship between the task instances contained in the baseline monitoring link graph changes, determining a newly added upstream dependent task instance corresponding to a changed task instance, and adding the newly added upstream dependent task instance and an upstream dependent task instance of the newly added upstream dependent task instance to the baseline monitoring link graph together to obtain an updated baseline monitoring link graph; and/or in a case that a dependency relationship between the task instances contained in the baseline monitoring link graph changes, determining an upstream dependent task instance removed corresponding to a changed task instance, and removing the removed upstream dependent task instance and an upstream dependent task instance of the removed upstream dependent task instance from the baseline monitoring link graph together to obtain an updated baseline monitoring link graph.

4. The method according to claim 1, wherein before the traversing, by the server, the baseline monitoring link graph from a baseline margin water level, the method further comprises:

obtaining a running change state of the task instance contained in the baseline monitoring link graph; and in a case that a reference task instance is run and completed, removing the reference task instance from the baseline monitoring link graph, and updating the baseline margin water level according to the baseline monitoring link graph from which the reference task instance is removed.

5. The method according to claim 1, wherein before the traversing, by the server, the baseline monitoring link graph from a baseline margin water level, the method further comprises:

obtaining a polling time for traversing the baseline monitoring link graph; and in response to a current moment reaching the polling time and the current moment is less than a baseline margin safety time threshold, no longer traversing the baseline monitoring link graph, wherein the baseline margin safety time threshold is a minimum value of safety running time thresholds of all the task instances on the target baseline, and the safety running time threshold of the task instance is a minimum value of predicted start times of all downstream task instances of the task instance.

6. The method according to claim 1, wherein after the determining, by the server, a predicted completion time of a task instance, the method further comprises:

in response to the predicted completion time being less than a baseline margin safety time threshold, removing the task instance from the baseline monitoring link graph, and no longer traversing the task instance, wherein the baseline margin safety time threshold is a minimum value of safety running time thresholds of all the task instances on the target baseline, and the safety running time threshold of the task instance is a minimum value of predicted start times of all downstream task instances of the task instance.

7. The method according to claim 1, wherein the determining, by the server and according to a comparison result between the margin value of the target baseline and an early warning margin or a comparison result between the margin value of the target baseline and a preset threshold, whether to trigger alarm information for the target baseline comprises:

in a case that the margin value of the target baseline is less than the preset threshold, or the margin value of the target baseline is less than the early warning margin, triggering an alarm; and in a case that the margin value of the target baseline is greater than or equal to the preset threshold, or the margin value of the target baseline is greater than or equal to the early warning margin, not triggering an alarm.

8. A computer device, comprising:

a memory and a processor, the memory and the processor being communicatively connected to each other, the memory storing computer instructions, and the processor executing the computer instructions to execute a method comprising:

obtaining business operation-related data of all task instances on a target baseline from a baseline guarantee task instance;

generating a baseline monitoring link graph by adding the task instances and the corresponding business operation-related data to a buffer queue and traversing the buffer queue;

traversing the baseline monitoring link graph from a baseline margin water level, wherein the baseline margin water level is a set of task instances corresponding to nodes with an in-degree of 0 in a baseline monitoring link, and determining a predicted completion time of a task instance according to a predicted start time of the task instance, an upstream dependency state of the task instance, and a historical running duration of the task instance in the baseline monitoring link graph, comprising:

in a case that the task instance is traversed for a plurality of times, determining a plurality of initial predicted completion times of the task instance according to the predicted start time of the task instance, the upstream dependency state of the task instance, and the historical running duration of the task instance in the baseline monitoring link graph; and comparing time magnitudes of the individual initial predicted completion times, and using an initial predicted completion time with a largest time as the predicted completion time of the task instance;

determining a margin value of the target baseline according to a commitment completion time and the predicted completion time set for the task instance; and determining, according to a comparison result between the margin value of the target baseline and an early warning margin or a comparison result between the margin value of the target baseline and a preset threshold, whether to trigger alarm information for the target baseline.

9. The computer device according to claim 8, wherein the generating a baseline monitoring link graph by adding to the task instances and the corresponding business operation-related data to a buffer queue and traversing the buffer queue comprises:

obtaining an upstream task instance on which the task instance depends;

obtaining other downstream task instances, other than the task instance, associated with the upstream task instance;

determining, according to a business time corresponding to an execution of a same task by the other downstream task instances, whether to add the upstream task instance to the baseline monitoring link graph; and in response to the upstream task instance needing to be added to the baseline monitoring link graph, adding the upstream task instance to the baseline monitoring link graph, and recording a dependency relationship between the upstream task instance and the task instance.

10. The computer device according to claim 8, wherein after the generating a baseline monitoring link graph by adding the task instances and the corresponding business operation-related data to a buffer queue and traversing the buffer queue, the method further comprises:

in a case that a dependency relationship between the task instances contained in the baseline monitoring link graph changes, determining a newly added upstream dependent task instance corresponding to a changed task instance, and adding the newly added upstream dependent task instance and an upstream dependent task instance of the newly added upstream dependent task instance to the baseline monitoring link graph together to obtain an updated baseline monitoring link graph; and/or in a case that a dependency relationship between the task instances contained in the baseline monitoring link graph changes, determining an upstream dependent task instance removed corresponding to a changed task instance, and removing the removed upstream dependent task instance and an upstream dependent task instance of the removed upstream dependent task instance from the baseline monitoring link graph together to obtain an updated baseline monitoring link graph.

11. The computer device according to claim 8, wherein before the traversing the baseline monitoring link graph from a baseline margin water level, the method further comprises:

obtaining a running change state of the task instance contained in the baseline monitoring link graph; and in a case that a reference task instance is run and completed, removing the reference task instance from the baseline monitoring link graph, and updating the baseline margin water level according to the baseline monitoring link graph from which the reference task instance is removed.

12. The computer device according to claim 8, wherein before the traversing the baseline monitoring link graph from a baseline margin water level, the method further comprises:

obtaining a polling time for traversing the baseline monitoring link graph; and in response to a current moment reaching the polling time and the current moment is less than a baseline margin safety time threshold, no longer traversing the baseline monitoring link graph, wherein the baseline margin safety time threshold is a minimum value of safety running time thresholds of all the task instances on the target baseline, and the safety running time threshold of the task instance is a minimum value of predicted start times of all downstream task instances of the task instance.

13. The computer device according to claim 8, wherein after the determining a predicted completion time of a task instance, the method further comprises:

in response to the predicted completion time being less than a baseline margin safety time threshold, removing the task instance from the baseline monitoring link graph, and no longer traversing the task instance, wherein the baseline margin safety time threshold is a minimum value of safety running time thresholds of all the task instances on the target baseline, and the safety running time threshold of the task instance is a minimum value of predicted start times of all downstream task instances of the task instance.

14. The computer device according to claim 8, wherein the determining, according to a comparison result between the margin value of the target baseline and an early warning margin or a comparison result between the margin value of the target baseline and a preset threshold, whether to trigger alarm information for the target baseline comprises:

in a case that the margin value of the target baseline is less than the preset threshold, or the margin value of the target baseline is less than the early warning margin, triggering an alarm; and in a case that the margin value of the target baseline is greater than or equal to the preset threshold, or the margin value of the target baseline is greater than or equal to the early warning margin, not triggering an alarm.

15. A non-transitory computer-readable storage medium, having computer instructions stored thereon for causing a computer to execute a method comprising:

obtaining business operation-related data of all task instances on a target baseline from a baseline guarantee task instance;

generating a baseline monitoring link graph by adding the task instances and the corresponding business operation-related data to a buffer queue and traversing the buffer queue;

traversing the baseline monitoring link graph from a baseline margin water level, wherein the baseline margin water level is a set of task instances corresponding to nodes with an in-degree of 0 in a baseline monitoring link, and determining a predicted completion time of a task instance according to a predicted start time of the task instance, an upstream dependency state of the task instance, and a historical running duration of the task instance in the baseline monitoring link graph, comprising:

in a case that the task instance is traversed for a plurality of times, determining a plurality of initial predicted completion times of the task instance according to the predicted start time of the task instance, the upstream dependency state of the task instance, and the historical running duration of the task instance in the baseline monitoring link graph; and comparing time magnitudes of the individual initial predicted completion times, and using an initial predicted completion time with a largest time as the predicted completion time of the task instance;

determining a margin value of the target baseline according to a commitment completion time and the predicted completion time set for the task instance; and determining, according to a comparison result between the margin value of the target baseline and an early warning margin or a comparison result between the margin value of the target baseline and a preset threshold, whether to trigger alarm information for the target baseline.

16. The non-transitory computer-readable storage medium according to claim 15, wherein the generating a baseline monitoring link graph by adding the task instances and the corresponding business operation-related data to a buffer queue and traversing the buffer queue comprises:

obtaining an upstream task instance on which the task instance depends;

obtaining other downstream task instances, other than the task instance, associated with the upstream task instance;

determining, according to a business time corresponding to an execution of a same task by the other downstream task instances, whether to add the upstream task instance to the baseline monitoring link graph; and in response to the upstream task instance needing to be added to the baseline monitoring link graph, adding the upstream task instance to the baseline monitoring link graph, and recording a dependency relationship between the upstream task instance and the task instance.

17. The non-transitory computer-readable storage medium according to claim 15, wherein after the generating a baseline monitoring link graph by adding the task instances and the corresponding business operation-related data to a buffer queue and traversing the buffer queue, the method further comprises:

in a case that a dependency relationship between the task instances contained in the baseline monitoring link graph changes, determining a newly added upstream dependent task instance corresponding to a changed task instance, and adding the newly added upstream dependent task instance and an upstream dependent task instance of the newly added upstream dependent task instance to the baseline monitoring link graph together to obtain an updated baseline monitoring link graph; and/or in a case that a dependency relationship between the task instances contained in the baseline monitoring link graph changes, determining an upstream dependent task instance removed corresponding to a changed task instance, and removing the removed upstream dependent task instance and an upstream dependent task instance of the removed upstream dependent task instance from the baseline monitoring link graph together to obtain an updated baseline monitoring link graph.

18. The non-transitory computer-readable storage medium according to claim 15, wherein before the traversing the baseline monitoring link graph from a baseline margin water level, the method further comprises:

obtaining a running change state of the task instance contained in the baseline monitoring link graph; and in a case that a reference task instance is run and completed, removing the reference task instance from the baseline monitoring link graph, and updating the baseline margin water level according to the baseline monitoring link graph from which the reference task instance is removed.

* * * * *